US005993123A

United States Patent [19]

Allred, III et al.

[11] Patent Number: 5,993,123

[45] Date of Patent: Nov. 30, 1999

[54] THREE-DIMENSIONAL DUPLICATING CARVING MACHINE

[75] Inventors: Jimmie B. Allred, III, Skaneateles; Earl R. Holden, III, Auburn; Stephen H. Blaisdell, Seneca Falls, all of N.Y.

[73] Assignee: Allred & Associates, Elbridge, N.Y.

[21] Appl. No.: 09/059,213

[22] Filed: Apr. 13, 1998

[51] Int. Cl.[6] ................................ B23C 1/16; B27C 5/00

[52] U.S. Cl. ............................ 409/109; 144/137; 409/93

[58] Field of Search ............................... 409/89, 93, 109, 409/115, 121, 124, 129, 162; 144/372, 137

[56] References Cited

U.S. PATENT DOCUMENTS

| | | | |
|---|---|---|---|
| 1,893,958 | 1/1933 | Parten | 409/93 |
| 2,093,009 | 9/1937 | Galbraith | 409/93 |
| 2,656,766 | 10/1953 | Martens et al. | 409/115 |
| 3,653,291 | 4/1972 | Babcock | 90/13.2 |
| 3,739,824 | 6/1973 | Hoenig | 144/144 |
| 4,000,766 | 1/1977 | Sutcliffe | 144/144 |
| 4,078,474 | 3/1978 | Laskowski | 90/13.3 |
| 4,095,633 | 6/1978 | Kimball et al. | 144/144 |
| 4,183,284 | 1/1980 | Laskowski | 90/13.3 |
| 4,227,557 | 10/1980 | Allen | 409/124 X |
| 4,288,185 | 9/1981 | Lenz | 409/121 |
| 4,364,695 | 12/1982 | Lenz | 409/103 |
| 4,554,740 | 11/1985 | Gill | 33/25 |
| 4,604,007 | 8/1986 | Hall | 409/89 |
| 4,673,011 | 6/1987 | Lapeyre et al. | 409/162 |
| 4,693,645 | 9/1987 | Kjeldsen | 409/86 |
| 4,749,013 | 6/1988 | Ducate, Sr. | 144/145 |
| 5,135,393 | 8/1992 | Eidenbenz et al. | 409/121 X |
| 5,256,011 | 10/1993 | Taylor | 409/92 |
| 5,492,057 | 2/1996 | Bornhors, Jr. et al. | 409/109 |

FOREIGN PATENT DOCUMENTS

| | | | |
|---|---|---|---|
| 61043 | 6/1912 | Switzerland | 409/93 |

OTHER PUBLICATIONS

Terrco, Inc.—"CM Series and Duplicarver™ Catalog, Spring & Summer '97", pp. 2–3; 9–11.

*Primary Examiner*—William Briggs
*Attorney, Agent, or Firm*—Brown, Pinnisi & Michaels PC

[57] ABSTRACT

A new duplicating carving machine that will allow individuals to easily and accurately carve wooden propellers, musical instruments, sculpture or other items. The invention has a unique and rigid carving mechanism, having a stylus and motorized cutter mounted upon a rigid "U"-shaped frame, combined with a simple and accurate alignment system, in which the U-frame pivots upon a transverse bar which is aligned upon side rails in the manner of a T-square, enabling the duplicator to easily and accurately carve a propeller or other item from a three-dimensional master. The duplicating carver of the invention is very simple to set up and operate, and includes a novel brake mechanism to stabilize the cutting motion. The average craftsman will be able to quickly and precisely shape a workpiece—any design from violin faces, electric guitar bodies or scroll work on cabinet doors, to airplane propellers, to name only a few. Only sanding is required to achieve the finished shape.

16 Claims, 3 Drawing Sheets

THREE-DIMENSIONAL DUPLICATING CARVING MACHINE

FIELD OF THE INVENTION

The invention pertains to the field of machines for carving wood and the like. More particularly, the invention pertains to machines for duplicating three-dimensional designs and objects in wood or the like using a carving router guided by a stylus.

BACKGROUND OF THE INVENTION

Duplicating carvers have been known for many years. Most have a router or other motorized cutting tool ganged to a stylus which is guided by the operator around a template. A master template is made up, which can be made of soft wood for ease of carving or from metal for longevity, and the template can be duplicated in hard wood or other material using the duplicating carver.

Two-dimensional carvers using pantographs (jointed parallelogram mechanisms) are familiar in the badge- and sign-making field. The stylus is traced around a path or groove in a template, and the router follows the same path to carve the letter or other design into wood or plastic blanks. The use of a pantograph allows increasing or decreasing the size of the sign relative to the template.

Three-dimensional duplicating carvers are similar, but add another degree of freedom to allow the duplicating carver to duplicate a three-dimensional original such as a propeller, sculpture, musical instrument, etc.

When one of the inventors herein was building an experimental aircraft, he found that the bored out, higher compression engine was significantly more powerful than a stock model "A" engine, putting out between 50 and 60 hp. This meant that he would have to experiment to get the optimum propeller.

When the time came to acquire a propeller, he was faced with the following options:

1. buy an inexpensive, lower quality, hand carved prop.
2. buy an expensive, high quality propeller.
3. inexpensively carve a high quality prop.

He decided to carve his own propeller. He was able to obtain the design for the original Pietenpol propeller (from the original propeller carver), along with recommendations on how to modify the design to pitch it correctly for the most efficiency. It would be very difficult to precisely carve two identical blades for a symmetrically accurate prop. A one-blade master propeller was carved, and it was decided to use a duplicator to carve two identical blades for the final propeller. This gave the option of modifying the master and easily carving additional props for changes in pitch, diameter, planform etc.

Getting an acceptable duplicator turned out to be the hard part. The inexpensive, plan-built, plywood carvers were not rigid enough for the accurate duplication needed. The mass produced general purpose duplicators were also too flimsy. An industrial duplicating mill was out of the question due to the extremely high cost. As a result, the present invention was designed to be the most accurate carver possible, but easy and simple to use, and less expensive than industrial mills.

Terrco, Inc., of Watertown, S. Dak., manufactures several general-purpose carving duplicators at this time.

The CM series uses a pantograph-like arrangement in which the stylus and router are each mounted on one end of two linked arms which are hinged at the other end to a pivot on a rod. The hinges allow the router/stylus to move roughly along a first horizontal axis (actually, along an arcuate path approximating the first axis). The pivot on the rod allows the router and stylus to move up and down in an arcuate fashion along the vertical axis. The rod is mounted at each end to slides, which allows the rod to slide along the third (second horizontal) axis. Thus, the cutter may move about all three axes. However, for very accurate carving, the semi-pantograph arrangement is too flexible, allowing the cutter to twist under the action of the router, and the arcuate movement of the arms in the horizontal plane makes it impossible to easily move the cutter straight along the axis.

The Terrco Duplicarver™ models mount the router and stylus to a horizontal rod. The router and stylus are fixed to the rod, but the rod is free to pivot in slides on each end, allowing the stylus and router to move in an arcuate fashion, primarily to allow the stylus and router to be swivelled fully horizontal, to work on vertical originals. The rod may also move in the slides from side to side along the first horizontal axis. The rod is mounted on the ends of a pivoting frame, which allows the rod (and hence the cutter and stylus) to move along the vertical axis (actually, along an arcuate path approximating the vertical axis). For motion on the second horizontal axis, the table upon which the workpiece and pattern are mounted must be moved fore-and-aft on a lower pivot arm. Once again, the arcuate movement for vertical motion is problematic, requiring simultaneous movement of the stylus and router on the guide rod, and the lower pivot arm and table, to travel a path along the vertical axis. The relatively thin guide rod introduces a degree of flexibility into the router which is also undesirable.

There have been many patents issued on carving duplicators. A few representative examples follow:

Babcock, PATTERN DUPLICATOR, U.S. Pat. No. 3,653,291 uses a vertically-suspended cutter and stylus. An overhead rail system is required, and the vertical motion is assisted with ropes, counterweights and pulleys. The wide frame is subject to torsional distortions, allowing the router and stylus to twist independently. No means is provided to limit the degrees of freedom of movement of the cutter.

Hoenig, PANTOGRAPH APPARATUS, U.S. Pat. No. 3,739,824 is a duplicating carver intended for spindles. The router and stylus may slide on vertical shafts and the entire cutting mechanism slides on rails for movement along a horizontal axis. Mechanisms for rotating the spindle provide the motion of the workpiece about the second horizontal axis, rather than having the stylus/cutter assembly movable about three axes.

Laskowski, THREE DIMENSIONAL DUPLICATOR ASSEMBLY, U.S. Pat. No. 4,078,474, and related U.S. Pat. No. 4,183,284, have the router and stylus are fixed to a shaft which is suspended by an "X" shaped frame. The other side of the frame is free to slide on a shaft which rolls on a wheel on each side along guide rails. The router and stylus are prone to unwanted motion due to the mounting on a relatively thin shaft which is free to rotate, and the "X" shaped support can twist about the thin center point, as well. The provision of single wheels on each end of the cross shaft allows the shaft to twist as it is rolled, introducing further distortions.

Mitchell, THREE DIMENSIONAL DUPLICATING CARVING MACHINE, U.S. Pat. No. 4,278,117, also uses single wheels on each end of the cross shafts, with the same twisting problem as noted above. Again, the stylus and router are mounted on a relatively thin shaft, which can twist.

Lenz, OUTBOARD TRACKING STATION FOR CARVING MACHINE, U.S. Pat. No. 4,288,185, moves the stylus outside the rails of the machine, to allow mounting a pair of routers inside the rails. The routers and stylus are mounted on relatively thin arms outward from a shaft, which allows for torsional distortion of both the arms and the shaft, and the shaft rolls on single wheels, allowing the same twisting problem as noted above. The arms swivel on hinges, as noted above for the Terrco Duplicarver™, with the same problem of arcuate side-to-side movement.

Taylor, MACHINE TOOL, U.S. Pat. No. 5,256,011, also moves a cutting arrangement using a cross-shaft with single wheels, with the problems noted. The stylus and router pivot arcuately around two different axes, as well as sliding side-to-side along the shaft. The large torsion box is awkward and tends to block any view of the work to the rear.

SUMMARY OF THE INVENTION

The duplicator of the invention is a new duplicating carving machine that will allow individuals to easily and accurately carve wooden propellers, musical instruments, sculpture or other items.

The invention has a unique and rigid carving mechanism, having a stylus and motorized cutter mounted upon a rigid "U"-shaped frame, combined with a simple and accurate alignment system, in which the U-frame pivots upon a transverse bar which is aligned upon side rails in the manner of a T-square, enabling the duplicator to easily and accurately carve a propeller or other item from a three-dimensional master.

The duplicating carver of the invention is very simple to set up and operate, and includes a novel brake mechanism to stabilize the cutting motion. The average craftsman will be able to quickly and precisely shape a workpiece—any design from violin faces, electric guitar bodies or scroll work on cabinet doors, to airplane propellers, to name only a few. Only sanding is required to achieve the finished shape.

DESCRIPTION OF THE PREFERRED EMBODIMENT

Figure 1:
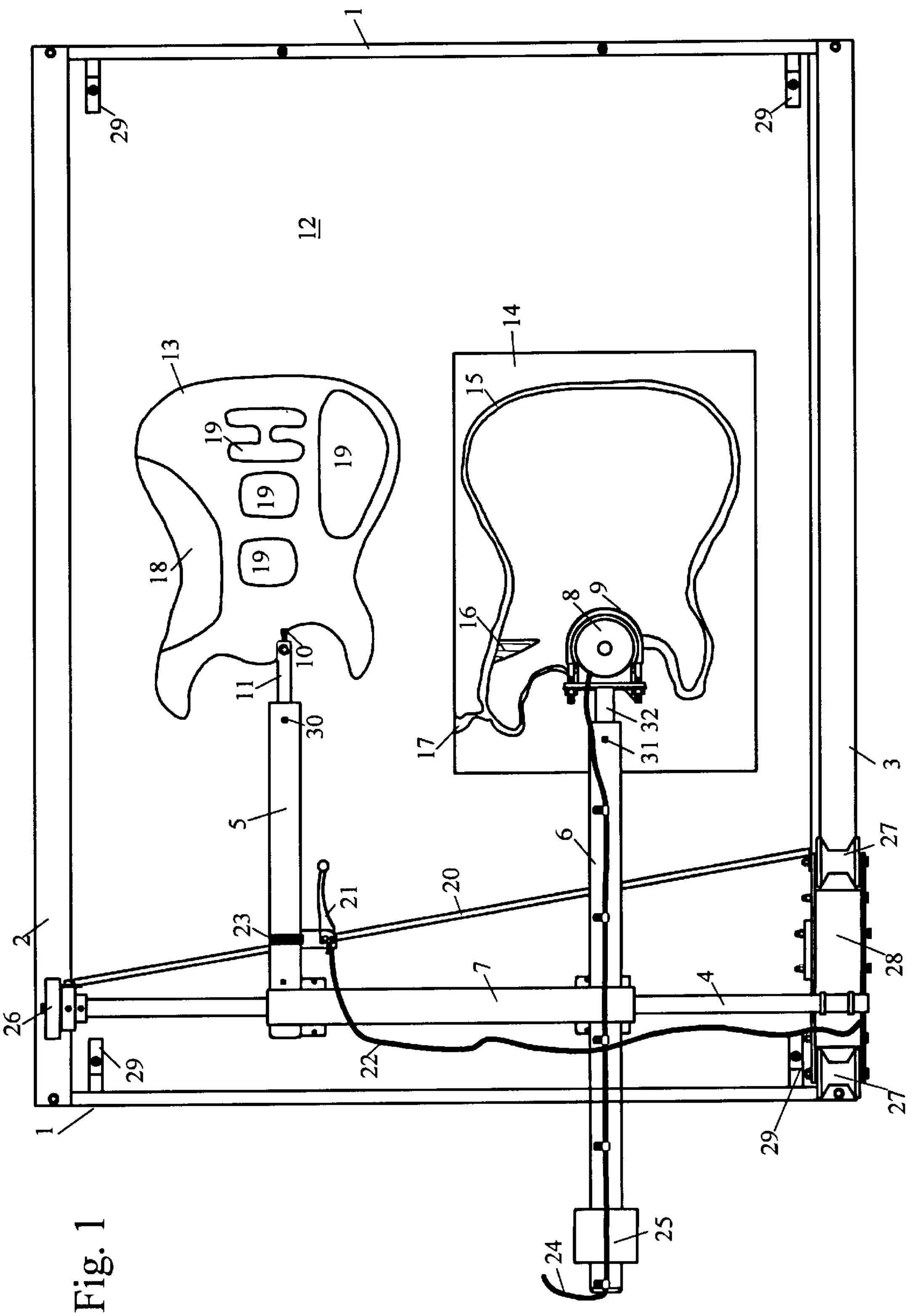
FIG. 1 shows a top view of the duplicating carver of the invention.
Figure 2:
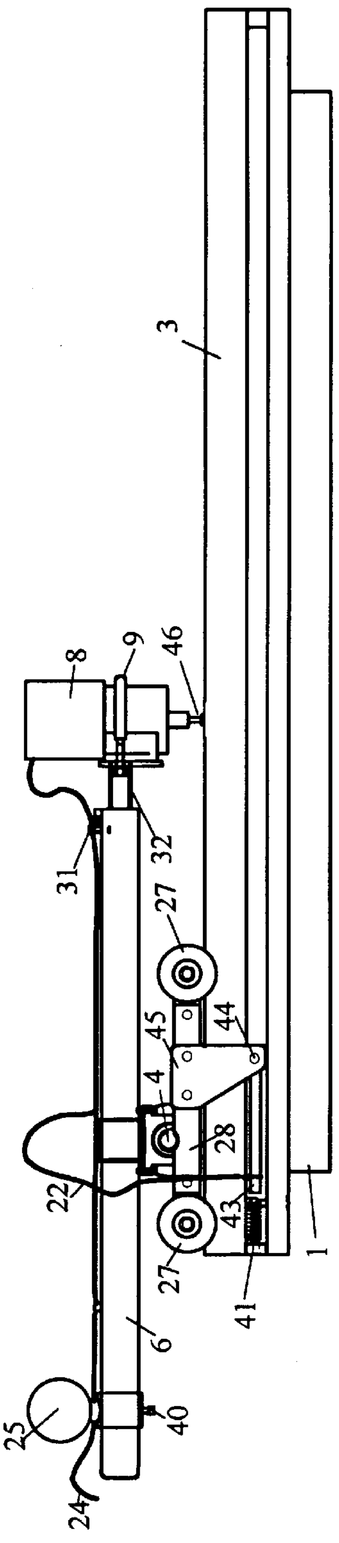
FIG. 2 shows a side view of the duplicating carver of the invention.

FIGS. 1 and 2 show the preferred embodiment of the duplicating carver of the invention, from top and side views, respectively. The bed (12) of the carver is a flat surface for supporting the workpiece and template. In a preferred embodiment, for work such as musical instruments, signs, cabinet doors, or other such relatively flat items, the bed is preferably a solid deck made of birch plywood, to allow securing, by gluing or screwing, whatever type of fixture required. For example, the electric guitar template (13) and partially carved workpiece (14) shown in FIG. 1 are fastened to the bed (12). Hot melt glue and blocks of wood may be attached to the bed to mount the work, if desired.

Figure 6:
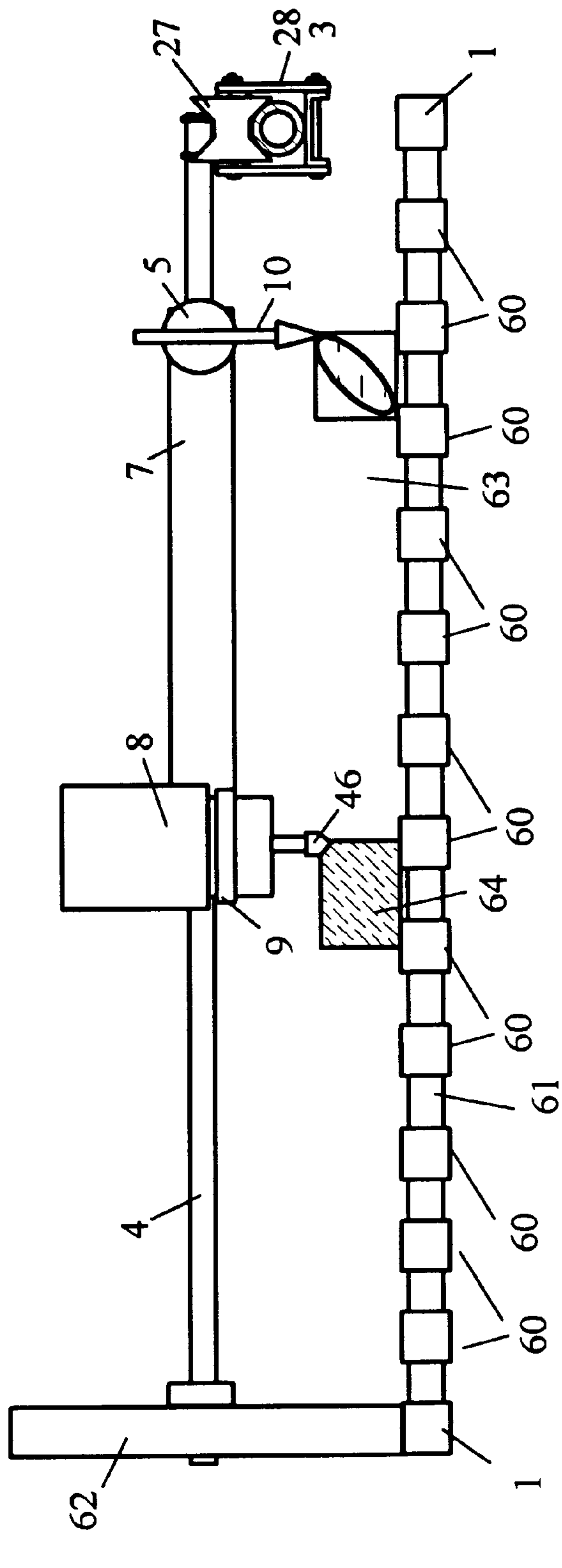
FIG. 6 shows an end view of the duplicating carver of the invention, in an alternate embodiment having a lattice-work bed and the transverse shaft supported upon the frame at one end.

In another embodiment, as seen in FIG. 6, especially useful for larger items such as airplane propellers (63) or the like, the bed may be a lattice work made up of longitudinal bars (60) and cross-pieces (61). The master propeller (63) and blank (64) can then be fastened down to the bars and firmly affixed for carving. Shavings can fall between the bars of the lattice, and not interfere with the carving process. If desired, the cross-pieces or the longitudinal bars could be omitted, leaving a bed made up of solely of a row of rigid bars running across or along the frame of the invention.

Figure 4:
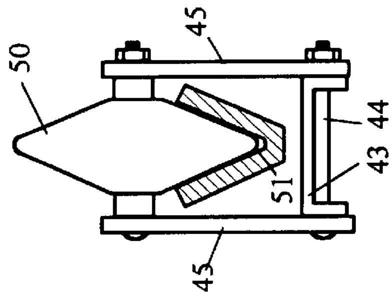
FIG. 4 shows an end-view detail of the guide wheel assembly, in an alternate embodiment using U-shaped rails.

A rigid frame (1) surrounds the bed (12), fastened to the bed by brackets (29) or other means, and holds all of the elements of the invention in alignment. On two sides of the bed (12) are mounted rigid rails (2) and (3). These rails are preferably made of tubular pipe (see FIG. 3), approximately 2 inches in diameter, with steel being preferred, although other materials and sizes could be used. Alternatively, as shown in FIG. 4, the rails could be made of "U" or "V" channel (51).

A transverse shaft (4), preferably made of ground steel for rigidity and strength, runs from one rail (2) to the other (3), level and parallel to the bed (12). The transverse shaft (3) is supported on one end by a wheel (26) or low-friction slide, which serves primarily to support the shaft (3) and hold the end of the shaft vertically in position. As shown in FIG. 1, wheel (26) can be a simple plastic wheel riding on the top of rail (2), as it does not provide any guiding force, and it is only necessary that the end of the shaft (4) be free to slide along the length of rail (2).

It should be noted that rail (2) is not required by the invention, so long as the support on that end of the transverse shaft (4) is sufficiently large to support the shaft parallel to the bed (12). FIG. 6 shows an embodiment of the invention where rail (2) has been omitted. Transverse shaft (4) in this case is supported by a large single wheel (62), which rides directly upon the frame (1), or could ride upon one of the longitudinal bars (60). The provision of rail (2) is preferred, however, as it lifts the transverse shaft (4) support above the shavings which tend to cover the bed (12) and frame (1).

The other end of the transverse shaft (4) is slidably mounted upon rail (3) by a carriage (28) which has a pair of guide wheels (27) separated by the length of the carriage (28). Preferably, the shaft (4) is mounted toward one end of the carriage (28). Optionally, if the carver is wide, with a long transverse shaft, a diagonal brace (20) may be provided from the other end of the carriage (28) to the other end of the transverse shaft (4) upon which wheel (26) is mounted. This arrangement of two wheels (27) and shaft (4), preferably with brace (20), provides a "T-square" capability, rigidly aligning shaft (4) perpendicular to the rails (2) and (3), but leaving it free to slide easily along the length of the rail (3). The wheels (27) are preferably made of Delrin® (registered trademark of E.I.DuPont DeNemours, Inc., for synthetic acetyl resin material) or other stiff plastic material, for long wear and minimal rolling resistance.

Figure 3:
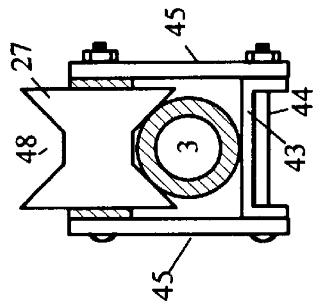
FIG. 3 shows an end-view detail of the guide wheel assembly, in an embodiment using tubular rails.

Preferably, as shown in FIG. 3, the wheels (27) are "V" (or "hourglass") shaped, with two straight, sloping sides (48) contacting the tubular rail (3), and centering the carriage (28) on the tubular rail (3). The center of the wheel could be simply a meeting of the two sides of the "V", or could be squared off as shown, which is easier to manufacture and provides more material along the axle of the wheel.

Alternatively, as shown in FIG. 4, double-conical shaped wheels (50) could be used, running in "U" or "V" shaped rails (51).

It should be noted that while there could be a similar carriage arrangement on the opposite end of the transverse shaft (4) within the teachings of the invention, this is not preferred because a pair of carriages would tend to bind if the rails (2) and (3) are not perfectly parallel. With the preferred embodiment shown, so long as the transverse shaft (4) is held perpendicular to rail (3), the alignment of rail (2) (within reason) is less important, as wheel (26) will ride on top of the rail (2) (a reason for using the plain wheel (26) shown, not another "V" wheel as used at (27) and absorb minor variations from parallel.

The carriage (28) preferably has side pieces (45) on each side of the rail (3), with a bolt or bottom piece (44) underneath the rail (3). The bolt (44) prevents the assembly from lifting off of the rail (3), while being free to pivot around the rail to some degree, if the wheel (26) should be lifted. The bolt (44) also provides a pivot mounting for one end of the brake pad (43), which is connected to a pull-cable (22). The other end of the pull cable (22) is attached to a brake lever assembly (21), as is commonly used on bicycle hand brakes, which is mounted by a strap (23) to the stylus arm (5).

If desired, a spring stop (41) may be provided at one or both ends of rail (3). Alternatively, a block of resilient material such as rubber or soft plastic could be used, or the carriage could simply be allowed to bump up against the rail support.

The stylus arm (5), preferably made of tubular steel or other strong, rigid, material, has a tracing stylus (10) for contacting the master template on one end, projecting downward toward the bed (12). The other end of the stylus arm (5) is rigidly attached, by welding, clamps or any other suitable means, to cross-element (7), with the arm (5) being attached perpendicular to the cross-element (7). If desired, the stylus (10) may be mounted on a smaller diameter arm (11) extending outward from the end of the stylus arm (5), secured in place by a lock or set-screw (30), which allows the distance between the stylus (10) and the transverse shaft (4) to be adjusted, and can also allow the stylus to be set at an angle to the vertical, if needed for some three-dimensional originals.

The cross-element (7) is slidably mounted on the transverse shaft (4). Ball bearings ride against the transverse shaft to assure smooth and easy sliding of the cross-element along the shaft (4), although other types of bearings or slides could be used within the teachings of the invention.

On the other end of the cross-element (7) from the stylus arm (5), the carver arm (6) is rigidly attached, again by welding, clamps or other suitable means, perpendicular to the cross-element (7) and precisely aligned parallel to the stylus arm (5). The carver arm (6) is preferably made of tubular steel, to resist any twisting or torsional distortions induced by the actions of the carver motor (8) as the cutting element (46) cuts the workpiece (14).

The motorized carver (8) is attached to the carver arm (6) by any appropriate means, such as U-clamps (9), which can firmly attach the carver to the end of the arm (6). As in the stylus arm (5) and stylus (10), the carver (8) is preferably attached to a smaller diameter arm (32), extending from the end of the carver arm (6), and locked in place by a lock or set-screw (31). This allows the distance between the carver (8) and the transverse shaft (4) to be adjusted, and can also allow the carver (8) and stylus (10) to be set at matching angles to the vertical, if needed for some three-dimensional originals.

Preferably, the carver arm (6) is longer than the stylus arm (5), and the excess length extends past the cross-element (7), with a counterweight (25) being mounted to the carver arm (6) by clamps (40), at the end of the arm opposite from the carver (8). The counterweight (25) may be slid along the carver arm (6) to balance out the weight of the carver (8), minimizing the effect of the weight of the carver (8) upon the stylus (10).

The combination of the stylus arm (5), cross-element (7), and carver arm (6) forms a solid, rigid "U" (or "Y", with the extension of the carver arm leading to the counterweight), locking the stylus (10) and carver (8) together without distortions from twisting or differential movement.

Figure 5:
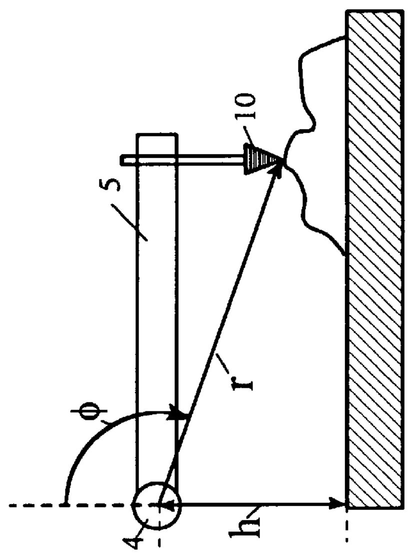
FIG. 5 shows a schematic diagram of the required alignment dimensions.

The design of the duplicating carver of the invention ensures that the elements which are necessary for accurate duplication of three-dimensional carvings are met (see FIG. 5 for a schematic of the dimensions in the following formulae):

1. $R_{stylus}=R_{cuitter}$—the distance from the transverse shaft (4) of the cutting element (46) on the carver (8), mounted on the carver arm (6) (with extension (32)) and the stylus (10) on the end of the stylus arm (5) (with extension (11)) will be the same, and the lengths of the extensions (32) and (11) and of the stylus (10) and cutting element (46) may be adjusted to ensure that this is so.
2. $h_{stylus}=h_{cutter}$—That is, the transverse shaft (4) must be parallel to the bed (12). The diameters of wheel (26) and wheels (27) are chosen such that the shaft (4) is the same distance from the rail at each end, and the wheels (26) and (27) rest firmly upon the rails (2) and (3) to maintain this alignment.
3. $\Phi_{stylus}=\Phi_{cutter}$—This alignment is established by attaching the cutter arm (6) and stylus arm (5) in alignment to the cross-element (7), and is maintained by the rigidity of the entire "U" assembly.
4. Motion should be rectilinear along the axes of movement. There are three axes of movement—two horizontal and one vertical. The "T-square" arrangement of the carriage (28) with its two wheels (27) holds the transverse shaft (4) rigidly perpendicular to the rail (3) as it slides along the rails (2) and (3). With the rails (2) and (3) held level relative to the surface of the bed (12), and the transverse shaft holding the "U" assembly of the cutter arm (6), cross-element (7) and stylus arm (5), motion of the stylus and cutter in the horizontal plane is thus rectilinear: the Uassembly moves from side-to-side along the transverse shaft, and the transverse shaft rolls fore-and-aft on the rail. While the vertical movement is slightly arcuate, the length of the cutter arm (6) and stylus arm (5) is significant enough relative to the vertical movement of most masters, that the arcuate element of the vertical movement is minimal.

FIG. 1 shows the duplicating carver of the invention in use, duplicating a body (13) for an electric guitar. The master template is a guitar body, with an indentation (18) sloping to one side, and hollow areas (19), and is fastened down to the bed (12) of the carver by hot glue, screws, or clamps. A flat blank workpiece (14) is fastened down to the bed (12), with the distance between the centers of the template (13) and the workpiece (14) being chosen to equal the distance between the stylus (10) and the cutting element (46).

The outline (15) of the template (13) is first cut by moving the stylus (10) in from the side, leading the cutting element (46) to cut a lead groove (17) into the side of the workpiece (14). When the stylus contacts the side of the template, it is then moved around the template, causing the cutter to follow around an identical path (15) on the workpiece. If desired, this could be done in several passes, cutting the path (15) deeper, until the outline of the master is duplicated on the workpiece. The three-dimensional contour of the template can then be carved, by moving the stylus (10) across the template (13), with the cutting element (46) following along through the workpiece.

It is at this point that the advantages of rigidity and accuracy of the invention become important, as all of the factors noted above come into play. In the example shown, several passes have been made across the sloping indentation (18), resulting in the beginnings of a matching indentation (16) on the workpiece.

For ease and accuracy of use, it is desirable to limit the degrees of freedom of the cutter when it is being moved. That is, when carving the indentation (16), it would be best to move the cutter from side-to-side along a straight path as it rides up and down on the template, without movement fore-and-aft. The brake mechanism of the invention provides a simple and effective means of locking the motion of the transverse shaft along the rail, thereby selectively eliminating one degree of freedom. The brake actuating lever (21) is mounted on the stylus arm (5), where it can be easily gripped by the right hand of the operator, locking the transverse shaft in place on the rail, as the left hand guides the stylus straight across the workpiece.

Because the duplicator allows for the easy production of complex shapes, for example airplane propellers, it will enable the builder to experiment with a number of propellers of different profiles to determine the optimum design for a particular airplane and engine. Once this optimum design is achieved, it will then be possible to precisely duplicate that shape over and over.

Accordingly, it is to be understood that the embodiments of the invention herein described are merely illustrative of the application of the principles of the invention. Reference herein to details of the illustrated embodiments are not intended to limit the scope of the claims, which themselves recite those features regarded as essential to the invention.

What is claimed is:

1. A duplicating carver comprising:
- a) a rectangular frame having a length and a width and four sides;
- b) a flat bed mounted on the frame;
- c) a first horizontal rail mounted along a side of the frame, parallel to and a selected distance above the bed, having a length substantially equal to the length of the rectangular frame;
- d) a carriage having first and second ends and a length therebetween, the first and second ends being supported by the first horizontal rail, free to move along the first rail;
- e) a transverse shaft having a length substantially equal to the width of the frame, a first end mounted to the carriage, and a second end movably supported above the flat bed such that the transverse shaft is parallel to the flat bed;
- f) a U-frame pivotally mounted upon the transverse shaft, free to move along the length of the transverse shaft and to pivot around the axis of the shaft, comprising:
  - i) a cross-element having first and second ends and a length therebetween which is less than the length of the transverse shaft, pivotally and slidably mounted on the transverse shaft;
  - ii) a stylus arm having first and second ends and a length therebetween, the first end of the stylus arm being mounted rigidly to the cross-element proximate to the first end thereof, the length of the stylus arm being perpendicular to the length of the cross-element, the second end having a stylus mounted thereon, the stylus having a tracing point at the end of a length perpendicular to the stylus arm; and
  - iii) a carver arm having first and second ends and a length therebetween, the carver arm being mounted rigidly to the cross-element proximate to the second end thereof, the length of the stylus arm being perpendicular to the length of the cross-element and parallel to the length of the stylus arm, the second end having a carver having a carving element mounted thereon, the carving element having a carving point at the end of a length perpendicular to the stylus arm;

the lengths of the carver arm and the stylus arm being selected such that the tracing point of the stylus and the carving point of the carving element are radially equidistant from the axis of the transverse shaft.

2. The duplicating carver of claim 1, in which the carriage comprises:
- a) a body having first and second ends and a length therebetween;
- b) a first wheel mounted proximate to the first end of the body; and
- c) a second wheel mounted proximate to the second end of the body.

3. The duplicating carver of claim 2, in which the first and second wheels are "V" shaped, and the first rail is tubular.

4. The duplicating carver of claim 2, in which the first rail is "V" shaped, and the first and second wheels are double-conical, such that the wheels fit within the "V".

5. The duplicating carver of claim 1, in which the carriage has a brake mechanism for locking the carriage in place on the first rail.

6. The duplicating carver of claim 2, in which the brake mechanism comprises a brake shoe having a first end pivotally mounted upon the carriage, and a second end which is pressed against the first rail by a brake cable; the brake cable being actuated by a brake lever mounted upon the U-frame.

7. The duplicating carver of claim 1, in which the length of the carver arm is longer than the length of the stylus arm, and the carver arm is mounted to the cross-element at a point along the length thereof such that the portion of the length of the carver arm which is on the same side of the cross-element as the stylus arm is selected such that that the tracing point of the stylus and the carving point of the carving element are radially equidistant from the axis of the transverse shaft.

8. The duplicating carver of claim 7, in which the carver has a weight, and the duplicating carver further comprises a counterweight mounted upon the carver arm, proximate to the end of the carver arm opposite to the end upon which the carver is mounted, such that the counterweight substantially balances the weight of the carver.

9. The duplicating carver of claim 1, further comprising a second horizontal rail mounted along a side of the frame opposite to the side above which the first rail is mounted, parallel to the first horizontal rail, at a constant distance above the bed, having a length substantially equal to the length of the rectangular frame, such that the transverse shaft support rides on the second horizontal rail.

10. The duplicating carver of claim 1, in which the flat bed is a sheet of rigid material.

11. The duplicating carver of claim 1, in which the flat bed is a plurality of rigid cross members.

12. The duplicating carver of claim 1, in which the flat bed is a rigid lattice.

13. The duplicating carver of claim 1, in which the carver arm comprises a plurality of interfitting portions and a locking mechanism, such that the length of the carver arm is adjustable.

14. The duplicating carver of claim 1, in which the stylus arm comprises a plurality of interfitting portions and a locking mechanism, such that the length of the stylus arm is adjustable.

15. An improved duplicating carver of the kind having a flat bed having at least one side, at least one rail mounted along the side of the bed, and a carving assembly comprising a carving element and a stylus on a stylus arm ganged together and movably mounted upon the rail, the improvement comprising a brake mechanism for locking the carving assembly in place on the first rail; in which the brake mechanism comprises a brake shoe having a first end pivotally mounted upon the carving assembly, and a second end which is pressed against the first rail by a brake cable; the brake cable being actuated by a hand-operated brake lever mounted upon the stylus arm, such that the brake mechanism may be operated by gripping the lever with one hand of an operator, locking the carving assembly in place at a preselected position on the rail while operating the duplicating carver, and then released to free the carving assembly to slide along the rail.

16. The duplicating carver of claim 15, in which the hand-operated brake lever is a bicycle hand brake lever.

* * * * *